UNITED STATES PATENT OFFICE.

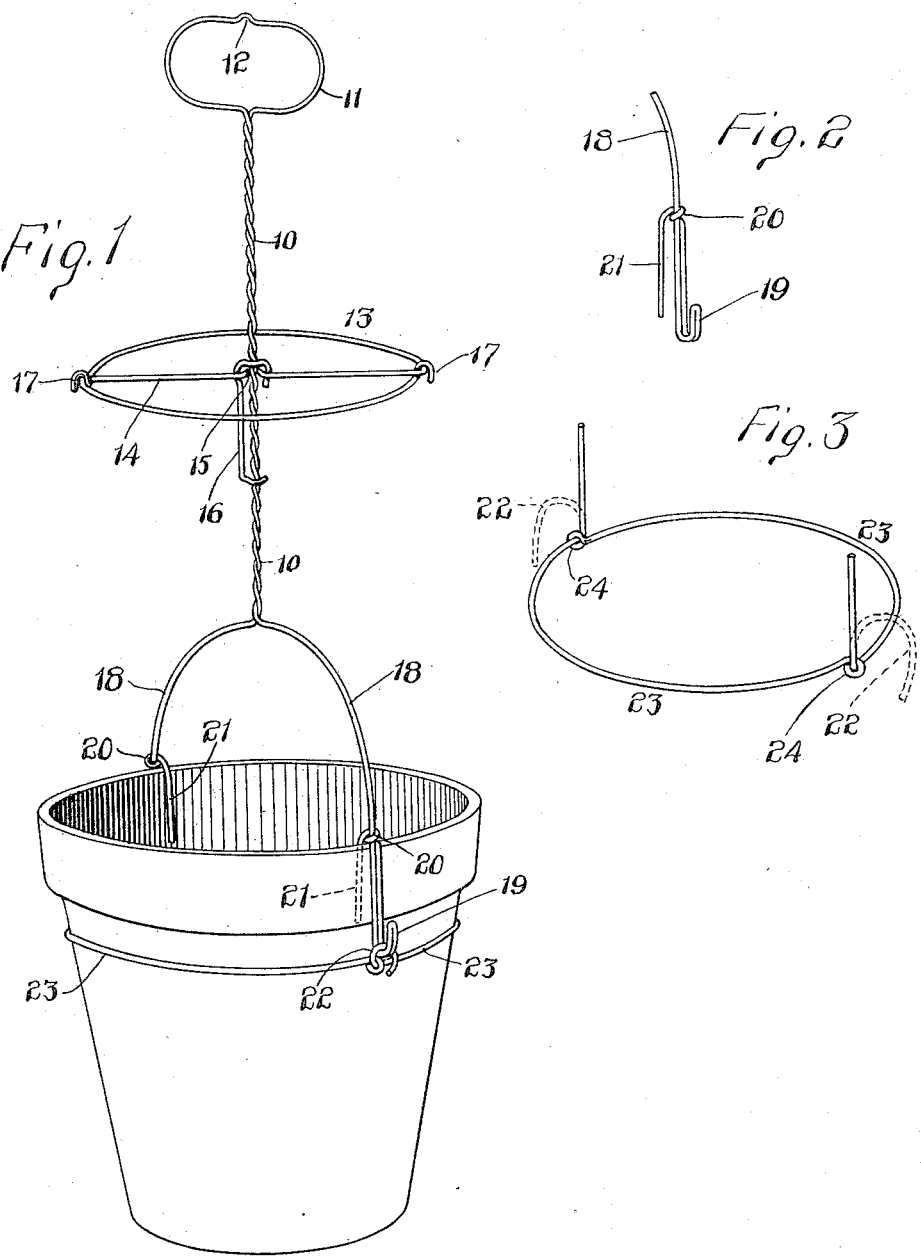

ROGER H. COMSTOCK AND ROBERT J. McKIE, OF MILFORD, CONNECTICUT.

FLOWER-POT HANDLE AND PLANT-SUPPORT.

1,127,191.  Specification of Letters Patent.  Patented Feb. 2, 1915.

Application filed December 22, 1913. Serial No. 808,073.

*To all whom it may concern:*

Be it known that we, ROGER H. COMSTOCK and ROBERT J. McKIE, citizens of the United States, residing at Milford, county of New Haven, State of Connecticut, have invented an Improvement in Flower-Pot Handles and Plant-Supports, of which the following is a specification.

This invention is a carrying forward and development of the invention forming the subject matter of Letters Patent No. 1,051,390, granted January 28, 1913, and has for its object to provide a plant support for use upon flower-pots in which the central stake shall be rigidly and centrally secured to the pot and which in addition to supporting the plant shall be adapted to serve as a handle and hanger for the pot and plant.

With these and other objects in view, the invention consists in certain constructions and in certain parts, improvements and combinations which will be hereinafter described, and then specifically pointed out in the claims hereunto appended.

In the accompanying drawing forming a part of this specification, Figure 1 is a perspective view illustrating our novel handle and support applied to a flower pot; Fig. 2 is a detail view illustrating the construction of the hooks upon the support, and Fig. 3 is a perspective view of the supporting ring detached.

10 denotes the stake which is formed from a piece of wire doubled and twisted together to form the stake proper and having at its upper end a loop 11, formed from the mid-portion of the piece of wire, which serves as a handle in carrying a plant in its pot and is also adapted to be engaged with a nail, hook or pin when it is desired to hang the plant, a central bend 12 being provided at the top of the loop to prevent it from slipping laterally when hung upon a support. The plant is supported by means of a ring 13 provided with a cross piece 14 having a half eye 15 which engages the stake and is secured thereto by means of a clip 16. The ring comprises two half rings each provided at its free end with a hook 17 adapted to engage the intersection of the cross piece and the other half ring, as in the said former patent. Below the stake the strands of wire of which it is composed diverge and form arms 18 which curve outward and downward. The wire of each arm is doubled upon itself and bent to form hooks 19 adapted to lie outside the edge of the pot and below the flange thereof. It will be noted that the hook and its shank are formed from doubled wire, the two strands lying side by side. The free end of the wire is coiled about the arm, as at 20, and then forms a downwardly extending finger 21, adapted to lie within the upper end of the pot and bear against it.

Our novel handle and support is secured to a pot through the engagement of the hooks with eyes 22 on a two-part ring 23 which incloses the pot. As pots supposed to be of the same size vary considerably in outside diameter and the widths of the flanges on the pots vary, we provide for adjustability of the rings by forming the eyes after the ring is in place. The rings comprise simply two pieces of wire, each piece having an off-set coil 24 at one end. The free end of each part is passed through the off-set coil of the other part, then the ring is adjusted to the required place on the pot, for example substantially as shown in Fig. 1, so that the downwardly extending fingers will have firm engagement with the inner wall of the pot, then the free ends of the wire comprising the rings are bent upward, as in full lines in Fig. 3, and then curved downward as in dotted lines in Fig. 3, to form the eyes 22 for engagement by hooks 19, as clearly shown in Fig. 1. Any surplus wire after forming the eyes may be cut off, if preferred, as in Fig. 1.

In the said former patent referred to, the important feature was that the plant supporting ring was centrally attached to the stake and did not have to be detached therefrom to place plants within the ring or remove them therefrom, as the free end of either half ring could be detached and the section opened out without interfering with the other section or the attachment of the ring to the stake. Our present structure retains all of these advantages with the addition that the stake is rigidly and centrally secured to the pot so that in addition to supporting the plant it serves as a handle or hanger for the pot and plant. It will be noted that by adjusting the ring small enough so that it will lie below the flange of the pot, there will be no looseness of the ring on the pot, that the hook and its shank will necessarily lie close to the pot, and that they will be rigidly retained in this position by the downwardly extending finger which engages the inner wall of the pot, and furthermore that by making the ring in the manner shown the eyes are necessarily located diametrically opposite each other and the pot is suspended centrally.

Having thus described our invention we claim:

1. A device to be secured to a flower pot provided near its upper end with an outwardly extending flange, comprising contiguous strands of wire forming an upstanding stake, said strands at the lower end of the stake being bent apart forming downwardly diverging arms, each arm having its material near the lower end thereof doubled upon itself and bent to form a hook to be exteriorly arranged upon the pot and twisted upon itself at a point spaced a substantial distance from the hook to provide a depending finger to be arranged within the pot, and a ring adapted to have a smaller diameter than the flange and surrounding the pot below the flange and engaging the hooks.

2. A device to be secured to a flower pot provided near its upper end with an outwardly extending flange, comprising a section of wire bent upon itself to provide a suspension loop from which depend two strands twisted together for providing a stake of substantial length, the strands at the lower end of the stake being bent apart forming downwardly diverging arms, each arm having its material near its lower end doubled upon itself and bent to form a hook to be exteriorly arranged upon the pot and twisted upon itself at a point spaced a substantial distance from the hook to provide a depending finger to be arranged within the pot, and a ring arranged below the flange and surrounding the pot in engagement with the hooks.

In testimony whereof we affix our signatures in presence of two witnesses.

ROGER H. COMSTOCK.
ROBERT J. McKIE.

Witnesses:
DAVID L. NETTLETON,
OMAR W. PLATT.

Copies of this patent may be obtained for five cents each, by addressing the "Commissioner of Patents, Washington, D. C."